United States Patent [19]

Schubert

[11] Patent Number: 4,819,813
[45] Date of Patent: Apr. 11, 1989

[54] DEVICE FOR HOLDING OBJECTS AND ARRANGEMENT PROVIDED WITH SUCH DEVICES

[75] Inventor: Otto Schubert, Vienna, Austria

[73] Assignee: Lift Verkaufsgerate-Gesellschaft m.b.H., Vienna, Austria

[21] Appl. No.: 899,225
[22] PCT Filed: Nov. 21, 1985
[86] PCT No.: PCT/AT85/00049
§ 371 Date: Jul. 25, 1986
§ 102(e) Date: Jul. 25, 1986
[87] PCT Pub. No.: WO86/03327
PCT Pub. Date: Jun. 5, 1986

[30] Foreign Application Priority Data

Nov. 27, 1984 [AT] Austria ................. 3757/84
Feb. 1, 1985 [AT] Austria ................. 291/85

[51] Int. Cl.⁴ ............................................. A47G 19/08
[52] U.S. Cl. .................................... 211/41; 211/60.1
[58] Field of Search ................. 211/41, 40, 60.1, 42; 312/183; 206/425, 564; 361/415

[56] References Cited

U.S. PATENT DOCUMENTS

| | | | |
|---|---|---|---|
| 1,484,291 | 2/1924 | Blakeslee | 211/41 |
| 1,900,148 | 3/1933 | Wood. | |
| 2,010,734 | 8/1935 | Parker | 211/41 |
| 2,263,255 | 11/1941 | West. | |
| 2,781,077 | 2/1957 | Dovidio. | |
| 2,781,078 | 2/1957 | Dovidio. | |
| 3,139,186 | 6/1964 | George. | |
| 3,200,957 | 8/1965 | Morin. | |
| 3,326,387 | 6/1967 | Princevalle | 211/41 |
| 3,467,741 | 9/1969 | Kesling. | |
| 3,784,269 | 1/1974 | Frenkel. | |
| 4,016,230 | 4/1977 | Michel. | |
| 4,566,839 | 1/1986 | Butler | 211/41 X |
| 4,629,067 | 12/1986 | Pavlik et al. | 211/40 X |

FOREIGN PATENT DOCUMENTS

| | | |
|---|---|---|
| 0085911 | 8/1983 | European Pat. Off.. |
| 0155258 | 9/1985 | European Pat. Off.. |
| 0162999 | 12/1985 | European Pat. Off.. |
| 715042 | 12/1941 | Fed. Rep. of Germany. |
| 1150190 | 6/1963 | Fed. Rep. of Germany. |
| 1611751 | 1/1971 | Fed. Rep. of Germany. |
| 2801567 | 7/1979 | Fed. Rep. of Germany. |
| 3017869 | 11/1980 | Fed. Rep. of Germany. |
| 8408388 | 4/1984 | Fed. Rep. of Germany. |
| 8419448 | 6/1984 | Fed. Rep. of Germany. |
| 2401783 | 3/1979 | France. |
| 674093 | 6/1952 | United Kingdom. |
| 2005226 | 4/1979 | United Kingdom. |
| 2050812 | 1/1981 | United Kingdom. |
| 82/01810 | 6/1982 | World Int. Prop. O.. |

Primary Examiner—Reinaldo P. Machado
Assistant Examiner—Sarah A. Lechok Eley
Attorney, Agent, or Firm—Ladas & Parry

[57] ABSTRACT

Proposed is a device (1) for holding and displaying CD, audio or video cassettes (2), which with their lower edge areas are obliquely supported in grooves (5) in a case (4), the grooves (5) having support areas cooperating in pairs, between which the cassettes are held in each of their skewed positions. The groove base can be provided with median rounded-off projections (16) for the cassettes and may have a cylindrical form or at least a section. The side walls of the grooves are recessed, and the grooves are stepwise arranged and may be mutually offset in height. The base (4) may be produced as an extruded section of profiled sheet steel or by vacuum molding, wherein the support fillets corresponding to the recessed portions of the grooves are removably placed in a mold and are removed from the mold together with the molded plastic sheet.

29 Claims, 5 Drawing Sheets

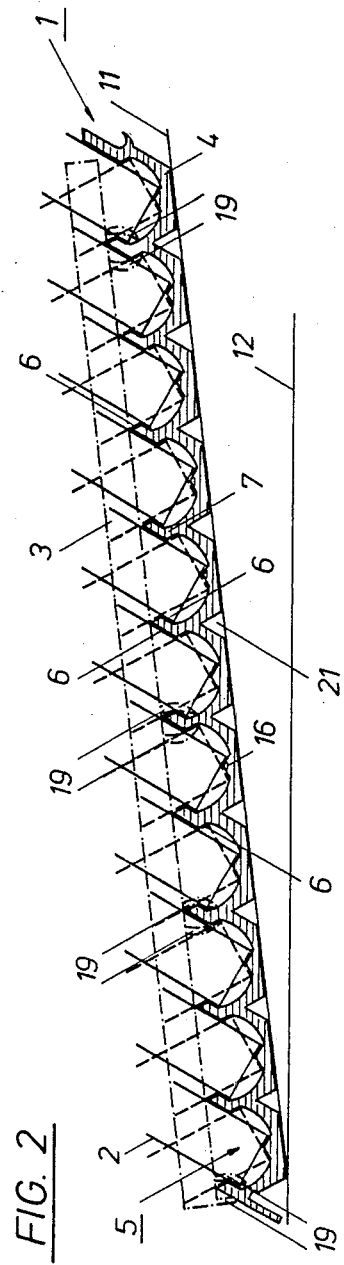
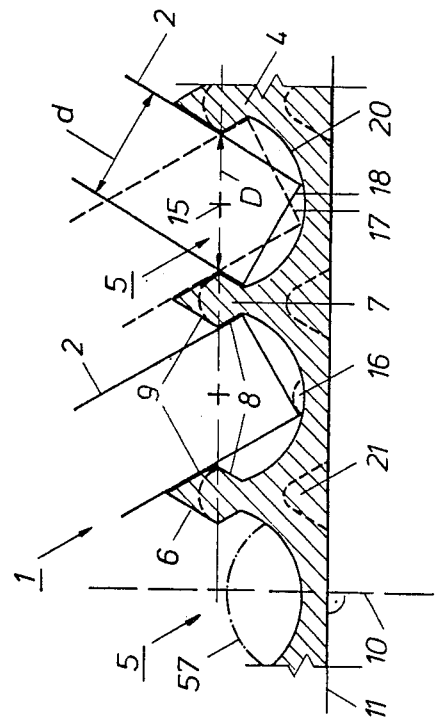
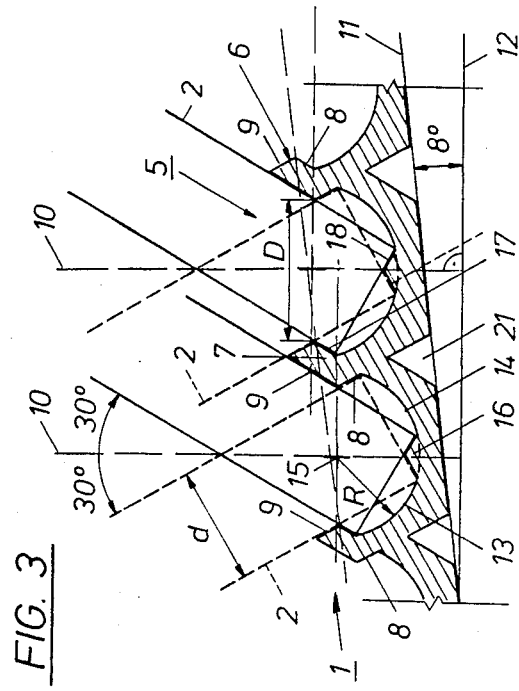
FIG. 2
FIG. 3
FIG. 5

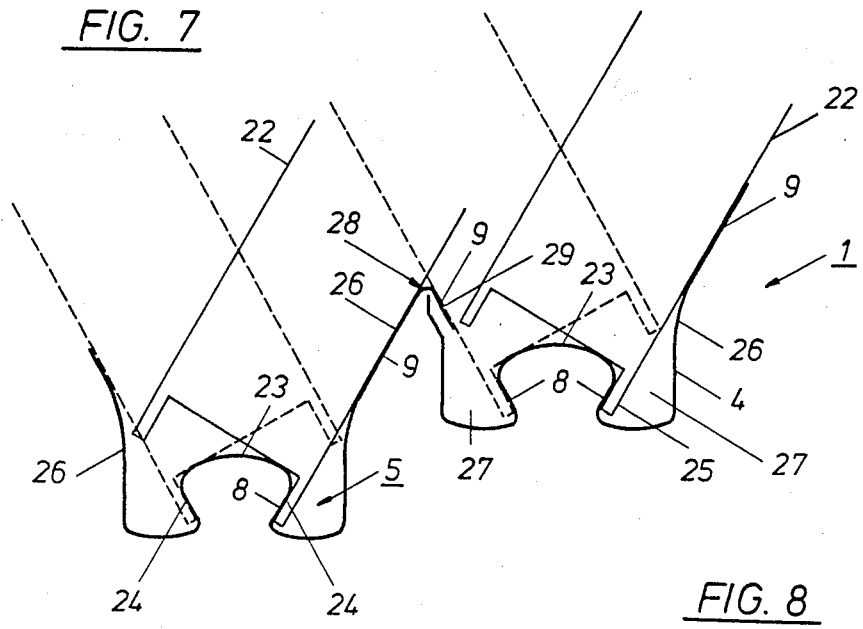
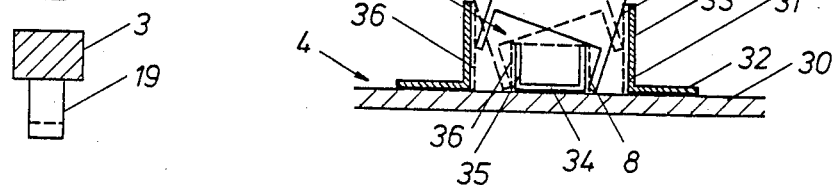
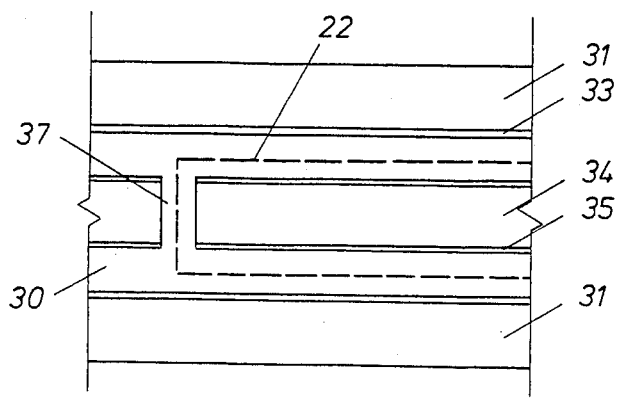

DEVICE FOR HOLDING OBJECTS AND ARRANGEMENT PROVIDED WITH SUCH DEVICES

GENERAL PRIOR ART

The invention relates to a device for receiving and presenting rigid, flat articles, such as, for example, CD, audio, and video cassettes, having a base supporting the articles in consecutive arrangement in a substantially vertical rearwardly inclined position, said base having transverse grooves for holding the articles against displacement.

MOST PERTINENT PRIOR ART

From German Patent No. 715 042 is known a drawer arrangement for holding files, outcards, and folders or other written documents, there being provided a box with at the bottom thereof a grid having transverse grooves to prevent the slipping off at the bottom of the documents held in the box. For supporting the documents there are also provided in the upper area of the box support rods transversely spaced from each other and practically dividing the box into compartments for holding each in the upper area a parcel of documents. This makes possible to turn over the sheets of the documents in each compartment in order to locate the intended page or the like. A quite similar arrangement with a profiled grid is described in U.S. Pat. No. 1,900,148. A dislocation of so-called CD (compact disk) cassettes, video cassettes or audio cassettes or similar relatively thick, flat rigid articles, particularly in such 'browsing', could not be prevented by these known file cabinets if they were used for receiving such articles; therefore, it will hardly be possible to receive such articles in such installations and display the same and, particularly, to make possible easy turning over of the sheets. But it is precisely such browsing which is absolutely desirable when presentation is required in certain businesses (record stores and the like); in a similar way as is already basically possible with conventional records, if they are simply kept in boxlike containers. But such boxlike containers also without other features are unsuitable for receiving said kinds of articles (cassettes) with the possibility of browsing, since said articles are quite thick and, on browsing, must be tilted and are thereby dislocated. Also if any of such installations are used for the said cassettes, this would be disadvantageous in that the articles would rub against each other and become scratched, particularly if several cassettes have already been removed, since these articles cannot then be held in order.

German Application Open to Public Inspection 2 801 567 has already proposed the use of means for box-shaped receiving troughs, said means being provided for dividing these troughs normally intended for receiving long-playing records into a plurality of lying one next to the other longitudinal compartments for audio cassettes. The audio cassettes are to be received in separate packages provided at the top with lettered sheets, and said packages are arranged one right after another in each longitudinal compartment, the bottom of the compartment being plane or stepwise rising. Also here the packages slip readily with audio cassettes if a compartment is not fully filled, and consequently, also here it is impossible to browse for a better view of individual cassettes.

From U.S. Pat. No. 2,263,255 and German Application Open to Public Inspection No. 3 017 869, devices are known for receiving objects, such as, for example, audio cassettes or chewing gum packages where there is provided a base in a boxlike container, said base being saw-shaped in cross section. On the back side of such receiving compartment there is provided a skewed support area integral with the base, and rearwardly inclined articles lie on such support area; the saw-shaped configuration of the base, similarly to the above-named known devices of the profiled base are intended to prevent the articles from sliding. Also here it is impossible to 'turn around' or 'browse' therethrough.

Similarly from U.S. Pat. No. 3,200,957 is known a device for presenting meat packages in self-service businesses, the meat packages being arranged one after another in a row in a flat skewed position being supported by a profiled base in a holding fillet of triangular cross section. This makes it possible that the meat packages partly overlapping each other do not lie directly one on the other; this makes possible, on the one hand, the satisfactory, circulation of cooling air and, on the other hand, withdrawal of a meat package without affecting other packages in the row. In order to securely hold the meat packages in the front edge area, said package area is overlapped by the rearwardly skewed and at the top inclinedly extending rear wall of the holding fillet. Nor is provided here or possible the browsing of the, as mentioned, flat and skewed lying meat packages.

DESCRIPTION OF THE INVENTION

The object of the invention is to provide a device of the kind described at the outset, where a plurality of flat, rigid articles, particularly of mentioned cassettes, is presented with the possibility of browsing and maintaining an orderly arrangement; the object is also to achieve a possibly best use of space and to provide simple construction and assembly.

The object is solved in that the device of the invention of the kind described at the outset is characterized in that the groove-shaped recesses themselves form pivotable bearings for the pivotable articles between the rearwardly inclined skewed position and a forwardly inclined skewed position, and for such purpose are equipped with in pairs combined support areas on the support walls, these in pairs combined support areas being so disposed in their mutual position and in their height that the articles are held in both skewed positions only with their lower areas. In this construction the groove-shaped recesses of the base not only prevent slipping of the articles, which is the case in the known devices with profiled bases, but they rather constitute also a pivotable bearing for each article, which both in its rearwardly inclined skewed position and in its forwardly slanted position is clamped or clasped and thus held only in its lower edge area in the groove-shaped recess in :a kind of three-point support (as seen in cross section), although the point of gravity of the article lies above the recess and, as seen in the plan, also outside thereof. The width of the groove-shaped recesses selected so as to fit to the thickness of the articles, the effective spacing between the support areas, which must not lie in horizontal relationship but which also lie slanted relative to one another and thus can grip the articles at different heights, is only slightly greater than the thickness of the articles and particularly according to the intended angle of the articles in each slanted position. This makes possible a 'turning over' of the articles without giving rise to problems, such as tilting out of the articles from the recesses, slippage or the like. This also provides the advantage that the articles are gently treated on browsing and particularly do not chafe against one another, since they are spaced from one another. Also, the articles are always kept in good and regular order, regardless of whether or not some articles are missing in a row. Furthermore, a simple construction is provided in that only one profiled base is necessary to make possible the described tilting of the articles.

It follows from the foregoing that it is advantageous for a tight accommodation of the articles if different, in pairs combined, support areas are provided for supporting one of the articles in the two different skewed positions.

It should be mentioned that, as can be seen in U.S. Pat. No. 3,784,269 and British Application Open to Public Inspection No. 2 005 226, a way to pivotably hold in a box device also thicker articles, particularly audio cassettes, is seen in providing for such articles their own holders pivotably supported in the box device and receiving the articles. The holders can be tublike with pivots received in corresponding recesses in side walls (U.S. Pat. No. 3,784,269), or box-shaped, with on the narrow sides provided bearing projections, which engage corresponding bearing recesses in the side walls (British Application Open to Public Inspection No. 2 005 226). These solutions are of complex and expensive construction, and also these known holders prevent rational use of space, a feature most desirable considering that many articles, are to be accommodated. An improvement was achieved here by another proposal (German Gebrauchsmuster No. 84 08 388), according to which transversely extending rods are provided for the pivotable support of the cassettes or the like articles in the lower edge areas thereof. Also, according to this proposal, there is achieved a kind of three-point support for the article; however, the assembly of the holding rods in the known device is still relatively cumbersome and expensive; in addition, problems may arise if a plurality of rows of articles are to be presented in a presentation frame and then the holding rods must extend over the width of the presentation frame; this can occasion a bending of said rods unless they are selected with a correspondingly larger diameter, but then again this involves poor utilization of space, since then the articles cannot be arranged so close to one another.

Above all, in order to securely hold the articles in both their skewed positions, the invention provides the advantage that the recesses are formed by grooves cut along both edges of the recessed grooves. Although the bottom of the groove can be flat per se, it is of particular advantage for a frictionless course of movement upon tilting the articles if the groove-shaped recesses have at least one in cross section arcuate sector for guiding one edge of each article upon its tilting.

Another advantageous factor is characterized in that the groove-shaped recesses have two sectors arcuate in cross section, separated from one another by a median substantially triangular projection. These median projections on the one hand provide a support for the articles upon tilting in the median area of their lower narrow sides as well as, upon corresponding fixing of the side areas of the projections, an additional fixing of the articles in each of their skewed positions.

It is also advantageous when both, in cross section arcuate sectors, are parts of one and the same cylindrical area and thus have an axis in common. The cylindrical in common axis also advantageously represents a pivot axis around which are pivoted the articles on browsing, so that in this arrangement the articles are guided with their lower edges in each phase of the movement upon tilting or browsing. Another advantage is that, in order to fix with particular precision the positions of the articles in their skewed positions, also in taking into account any tolerances of manufacture, the grooves as bearing areas for the articles have in the area of their edges contact surfaces extending in parallel and they also have lug surfaces, the contact surfaces being obliquely upwardly and the lug surfaces obliquely downwardly directed, and in each case the contact surfaces and the jamb surfaces are parallel on the edges opposite to each other. Each article is exactly secured between these contact surfaces and lug surfaces or also holding surfaces in the article's front or also rear skewed position, and in an—also tight—arrangement of a plurality of articles in a row one after another. Said articles have their main planes substantially parallel, so that they cannot harm each other even at relatively great heights.

To achieve an advantageous sight angle in observing the front sides of the articles, it proved to be expedient if the contact surfaces and lug surfaces have an angle of about 30° with the median plane or symmetry plane of each group. A particularly advantageous embodiment of the device of the invention is characterized in that the grooves are provided in stepwise ascending or descending arrangement, the consecutive recesses of neighbor grooves being mutually offset in height. A particularly tight arrangement of articles in one row one after another can be achieved in this embodiment and enough material will remain for the walls or crosspieces which separate the grooves to secure sufficient strength also over longer stretches.

In order to better adapt the device to any conditions in attaching to a presentation mount (and in this connection an ascending or descending arrangement of the articles of a row is desired in order to better observe the articles), as well as particularly in the case of the above-mentioned, mutually offset recesses, it is advantageous if the grooves are disposed according to an imaginary plane, which at about 80° slantingly extends to a plane perpendicular to the median or symmetry plane of each groove. This is made possible, for example, in that the grooves ascend or descend according to a plane slanted at 80° to the horizontal and yet the median or symmetry planes of the grooves vertically extend, and consequently, the angles which enclose the articles with their main planes in both skewed positions with the vertical, are of equal magnitude and amount, for example, to 30°. But insofar as the said imaginary plane is horizontally disposed in this embodiment, so that all articles are at one and the same height level, different angles, e.g. 22° (30°−8°) or 38° (30°+8°), result for skewed positions of both articles, which can be utilized according to each base height of the device, i.e. according to the height of the device relatively to the observer, for a possibly best surveying view. It will be often advantageous for the arrangement of the device at approximately the height of the body to arrange the grooves according to a horizontal plane, and in this connection it might be often desirable to provide equal angles in the front or rear skewed position of the articles. It is expedient for such case if the grooves are arranged according to an imaginary plane which extends perpendicularly to the median or symmetry plane of each groove. This makes also possible a uniform symmetrical construction of all grooves as well as of the walls defining said grooves, which will also simplify the production of a so-profiled base. It is also advantageous in this connection if the grooves are separated from one another by symmetrically designed crosspieces if the grooves are separated first from the bottom to the top according to cylindrical sectors tapering and then by bead-like thickened symmetrically designed crosspieces.

The so far described embodiments are particularly adapted for exhibiting or presenting CD cassettes, video cassettes, and also audio cassettes, the different tapes of video cassettes being readily received and arranged in rows in the groove-shaped recesses. On the other hand, for the kind of video cassettes designed in the form of a book and which flange like have front and rear walls projecting over the actual cassette cases, the feature proved to be advantageously characterized in that the recesses are each divided by medially disposed hump like fillets to form two partial grooves extending in parallel, each for receiving one of the overhanging cassette walls. Thus, the hump like fillets in this embodiment extend on the lower narrow sides of the video cassettes between the front wall and the rear wall to ensure additional stabilization.

In this connection, another possibility is to fix the video cassettes in each skewed position only over one or both walls, for example in the rearwardly inclined skewed position over the back or rear wall and in the forwardly inclined skewed position over the front wall. According to the invention, it is advantageous when in each case a side wall of the fillet and the thereto-opposite side wall of the recess define the bearing areas for the video cassette in one of their two skewed positions.

In order to securely hold down each wall of the video cassette in its lower edge, it is advantageous if at least the side walls of the fillet are provided with recesses (undercuts).

Furthermore, in order to guide the video cassettes in this embodiment upon their tilting, it is advantageous if the upper side of the hump-shaped fillets is cylindrically arched to form a guide-slide-surface for the underside of each video cassette between the overhanging front and rear walls.

To obtain a possibly simple design, it is quite conceivable to give a vertical design to the side walls defining the recesses. In this connection the side walls of the recesses can be simply formed by an arm of angular profiles, which are mounted on the base plate by the other arm. The hump-shaped fillets can also be simply formed by U-profiles fastened on a base plate.

In order to firmly hold the video cassettes, particularly if the side walls of the fillets or the recesses are not to be undercut, it proved to be advantageous if at least the side walls of the fillet are provided with a friction-increasing coating, e.g., a foam plastic coating. It is also obviously possible in such cases to provide a friction-increasing coating or a foam plastic coating on the entire surface of the groove-shaped recesses, including the hump-shaped fillets.

Usually, the so-coated booklike video cassettes with overhanging front or rear walls have a spine overhanging their actual cassette body and connecting the front wall and the rear wall. With such cassette design, in order to provide space in the groove-shaped recesses for the downwardly overhanging spine, a provision can be made for the hump-shaped fillets to extend only over a portion of the length of the recesses. In the case of the above-mentioned design with angular profiles and U-shaped profiles, which are mounted on a base plate, this can be simply done so that the U-profiles which form the hump-shaped fillets are selected to be shorter, than the side walls of the angular profiles which form the recesses.

A discontinuous design of the medially disposed hump-shaped fillets can also be provided in a different way, such as with the base made of a plastic molded part; in addition, also cuts can be provided in the hump-shaped fillets. Such design is particularly advantageous if several video cassettes are disposed one next to the other in a through perforation, on a width of about 1 m or 120 cm, and accordingly, an advantageous embodiment of the device of the invention is here characterized in that the hump-shaped fillets are discontinued in distances approximately corresponding to the width of the video cassettes; they are, for example, indented in order to receive the downwardly overhanging sections of the spines of the video cassettes.

As already mentioned, the bottom of the device of the invention can be made as a plastic molded part or by providing profiled rails on a flat bottom plate. But for simple and inexpensive production, it proved to be advantageous if the base is an extruded profiled sector, particularly of aluminum. Such bottom parts of extruded aluminum sectors are particularly suitable for use in presentation mounts for video cassettes.

On the other hand, an embodiment proved advantageous for larger and heavier video cassettes characterized in that the base is of one or several profiled sheet iron sections, e.g. of steel. It is here also advantageous not to join together too wide sections of sheet iron into a shelflike presentation mount for the video cassettes, the sheet iron sections disposed one after another being joined by overgripping hook-shaped bent edges.

The above-mentioned design of the base members as extruded profiled sectors can also be used if the device is applied for home furniture as in the case of providing such base in a drawer of a chest in order to provide an assorted easy to inspect, storing of the CD cassettes or like articles also by a private user. A special advantage particularly for the purpose of presentation in record or cassette shops is if the length of the recesses is measured for a plurality of articles one next to the other, and at least one partition in the form of a bar or rail is mounted on at least some of the walls defining the groove-shaped recesses for separating the so-obtained rows of next to the other and one after another disposed articles.

Also, for example, partition plates can be provided between the rows of articles as dividers, which, for example, are mounted on a front wall and on a rear wall of a box-shaped container or trough in which is provided the device of the invention. But above all, in order to be independent of such receiving containers and their design and to provide uniform dividers, it is advantageous if the divider, as mentioned, is in the form of a bearing or rail and is mounted on at least some walls defining the groove-shaped recesses.

It is also advantageous in this connection if the dividers made, for example, of plastic, in a manner known per se are provided with therefrom-extending, and in pairs arranged, flexible, deflectable snap projections for clamping on the walls. This embodiment is particularly advantageous if it is meant for receiving CD cassettes, so that the dividers are subjected to less strain.

If the video cassettes are inserted in the device, a firm connection of the dividers may prove to be advantageous; accordingly, an advantageous embodiment of the device of the invention is characterized in that the dividers are joined to the walls by welding, soldering or gluing.

But on the one hand, it is also possible, in order to separate the articles arranged next to one another within the groove-shaped recesses, to provide, for example, burl-shaped lug projections for the articles. In this arrangement, the articles lie on the sides on the lug-forming projections, so that a farther lateral shift and the resulting disruption of the row order are prevented. Such arrangement is expedient if the bottom is manufactured as a part molded of plastic.

As mentioned already, the arrangement of the device can be applied to compartments or drawers, such as for receiving cassettes in use by private persons. Also here the device of the invention can be provided as an insert part (insert base) for conventional receiving troughs or the like in businesses. Particularly advantageous is the use of the device of the invention in cupboardlike display cases, where several devices can be arranged one after another and, possibly, one on another. In this connection, the embodiment of the invention proved particularly advantageous, where the grooves are arranged in a stepwise ascending or descending order, since such ascending or descending order can be utilized at the same time as the best space arrangement in the display case while providing a good possibility of survey by an observer.

Accordingly, the invention also relates to an arrangement having a plurality of devices of the invention in a display case; according to the invention, such arrangement is characterized in that the devices are provided one after another in the lower area of the display case substantially in the known per se shape of a concave mirror in the side view, and in each case with a slanted base, with a rearwardly sloping groove arrangement and in each case with the base beginning at the same level. The articles then enclosed in the front slant a smaller angle to the vertical than in the rear skewed position, and the difference in height between the rear end of the base of a device and the front end of the base of the next following device is about equal to the level of an article in the rearwardly skewed position.

It should be mentioned here that it has been already proposed (German Gebrauchsmuster 84 19448) that the display case shaped in side view substantially as a concave mirror has regularly disposed horizontal rows of receiving drawers in the upper area of the case, with stepwise ascending boxlike horizontal receiving compartments arranged one after another in the lower area of the case. This case construction proved to be quite advantageous, and the design of the invention, namely of the skewed position of the rows of receiving compartment, based on the described stepwise ascending or descending arrangement of the grooves, provides, on the one hand, the advantage of still better use of space adapted to receive still more cassettes, and on the other hand, still more improved accessibility to the CD cassettes in the receiving compartment.

Additionally, space can be still better utilized if two more devices are provided, over the rearmost device, of which the lower one is likewise provided with a rearwardly sinking base and the upper one with the rearwardly rising base.

It has been mentioned already that the base of the device can be made as an extruded profiled aluminum sector or as a profiled sheet iron, also as a plastic part. A suitable method is deep drawing or vacuum shaping of a sheet of thermoplastic material; this is however problematic in the case of the described configuration of the groove-shaped recesses with undercut (recessed) edges. Generally, in vacuum molding a sheet or a plate of plastic is first heated and then moved to the die and molded according to approximate shape of the die. The plastic obtains the final shape by tight pressure against the surface of the die by the application of a vacuum to the die or to the therein-provided suction channels, so that the plastic material is intimately sucked in to the surface of the die. After cooling and setting of the plastic material, the produced article can be removed from the die. To prepare articles with recessed areas, the die is usually divided and the parts thereof can be shifted independently one from the other to remove the shaped articles, in order to release the recessed area of the article, so that the 'locking' of the undercut is released on the die. But such divided dies are expensive, both in production and in operation.

Therefore, the object of the invention is also to provide a method for preparing the device of the invention, as stated with undercuts in a simple way provided on the groove edges of vacuum-shaped devices, i.e. base parts, and where the articles can nevertheless be removed without difficulty from the die. It should also be taken into account that such vacuum-shaped base parts should be strong enough to accommodate a plurality of rows of, for example, video cassettes.

Accordingly, the method of the invention is characterized in heating a sheet of thermoplastic material and in pressing by means of underpressure to a die provided with suction channels, detachably equipped with, for example, angular support fillets, for example of sheet steel or plastic previously shaped according to the undercut edges of the grooves, the sheet on being sucked into the die being shaped around said support fillets, and thereafter cooling the shaped sheet and removing it from the die together with the support fillets. Thus, in this method a support fillet conforming to the undercut area of the groove edge is inserted as a 'lost mold part', and to these lost mold parts the sheet on suction adheres to the mold; it is shaped according to said support fillets, to produce the intended undercut configuration. Attention should be paid that the vacuum or the underpressure is applied in the vicinity of the support fillets, thus to suck in the sheet also to the support fillets; accordingly, it is advantageous to use a die where at least some suction channels open, adjoining the said recesses for the shaft areas of the support fillets, on the surface of the die.

After the plastic has set, the vacuum-shaped base part is removed from the die together with the support fillet, which now forms a part of said base part. It is also advantageous that a simple die can be used for producing the base parts with undercut groove edges, said die providing another advantage that the support fillets form a 'reinforcement' for the base part, so that the produced base parts are stronger, more rigid, etc. This makes possible that the base parts readily reach dimensions of, for example 100×40 cm.

It is conceivable to clamp the support fillets from the front sides to the die or by means of a detachable adhesive, such as, for example, wax, to detachably attach to the die. But it is advantageous for a particularly simple introduction and removal if the support fillets each are inserted with the shaft area in a recess in the die.

In so far then if the shaft area on the other side of the produced base part would not be disturbing, it can be left without any further machining. But it would also be advantageous if, after the vacuum-shaped base part is removed from the die, to separate the projecting shaft areas of the support fillets. The separation can be carried out by, say, cutting off the milled portions.

Furthermore, according to the invention it proved to be practical if an adhesive or bonding agent, such as glue, for example, is applied to the support fillet prior to the suction of the sheet, in order to reinforce the bonding between the support fillet and the plastic material of the sucked-in sheet.

It is also expedient if the bonding between the support fillet made of plastic and the plastic material of the vacuum-shaped sheet is reinforced by welding.

It is also expedient in this connection if the bonding is reinforced by ultrasound welding. In the die used for the method of the invention, the recesses expediently extend substantially according to the direction in which the vacuum-shaped base part is removed from the die surface into the die. This provides particularly simple, easy removal of the produced base part from the die, although it certainly would be possible, in the case of support fillets flexible within certain limits, to let the recesses extend also at an angle to the direction of the removal of the base parts from the die, and the support fillets, i.e. their shaft areas, would then flexibly bend on the removal of the base part.

SHORT DESCRIPTION OF THE DRAWINGS

The invention will now be described as accompanied by the drawings showing the embodiments.

More particularly, in the drawings:

FIG. 2 is on a greater scale a longitudinal section through the device, according to line II—II in FIG. 1;

FIG. 3 is a partial cross section of the device on a larger scale, to show the configuration of the grooves receiving the CD cassettes;

FIG. 4 is a cross section of a bar-shaped divider, such as provided in FIGS. 1 and 2, according to line IV—IV in FIG. 2;

FIG. 5 is a section of a modified embodiment corresponding to FIG. 3;

FIGS. 6 to 8 show the sections according to FIGS. 3 and 5 of three other embodiments particularly adapted for receiving video cassettes, and FIG. 9 is a partial plan view of the embodiment according to FIG. 8;

Figure 6:
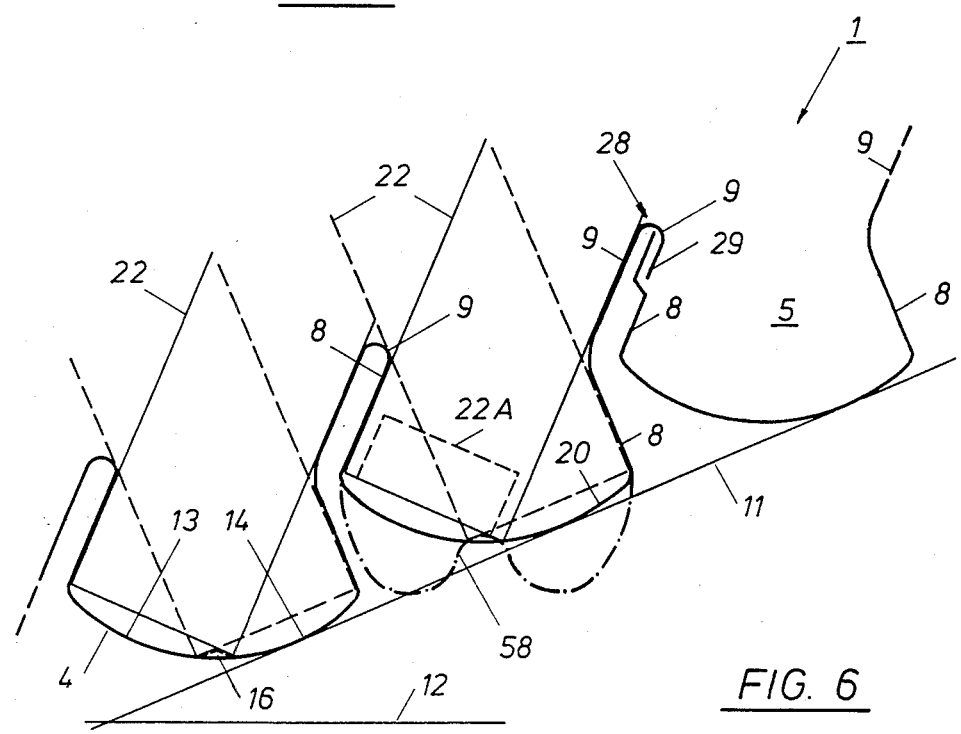
Figure 11:
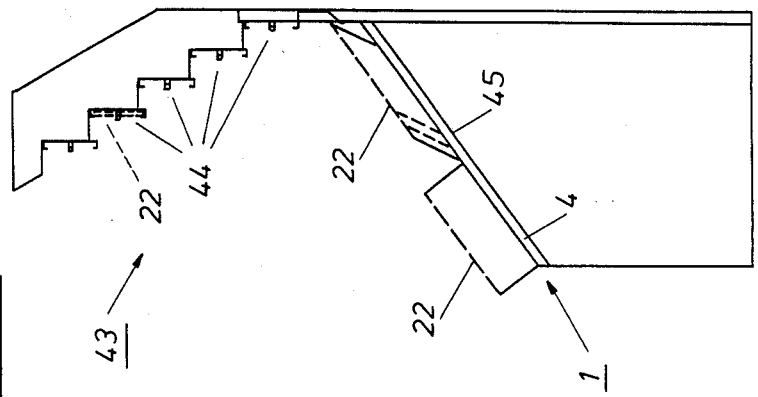
Figure 10:
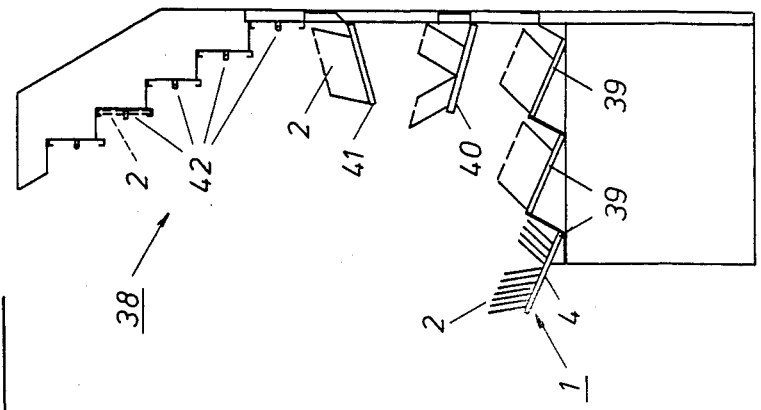
Figure 12:
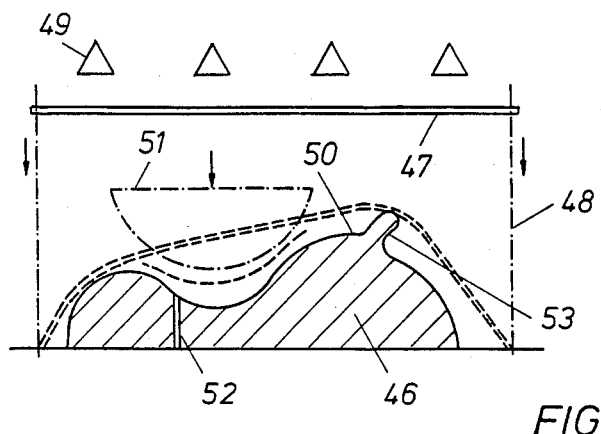
Figure 13:
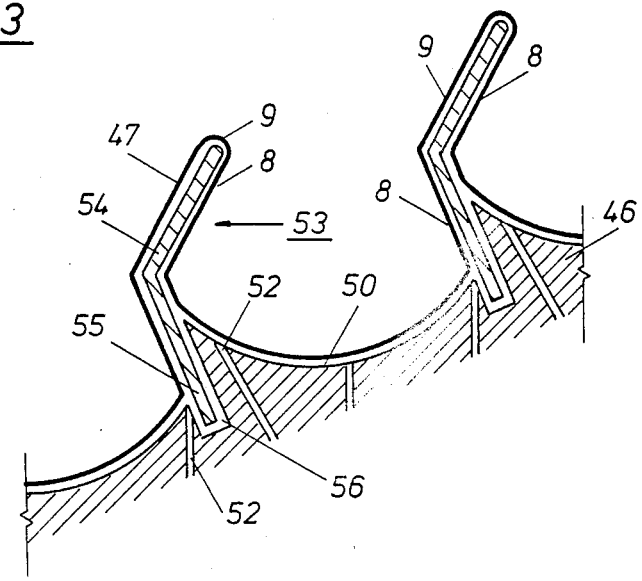

FIGS. 10 and 11 each are a diagram of a display case with an arrangement of devices according to the invention for receiving CD cassettes (FIG. 10) or video cassettes (FIG. 11);

FIG. 12 shows a basic diagrammatic representation of a known arrangement of vacuum molds of plastic sheets, and FIG. 13 is a section in detail of a part of a mold with support fillets arranged detachably therefrom and a therearound vacuum-shaped thermoplastic sheets for producing a device in the shape of a profiled base part according to FIG. 6.

Figure 1:
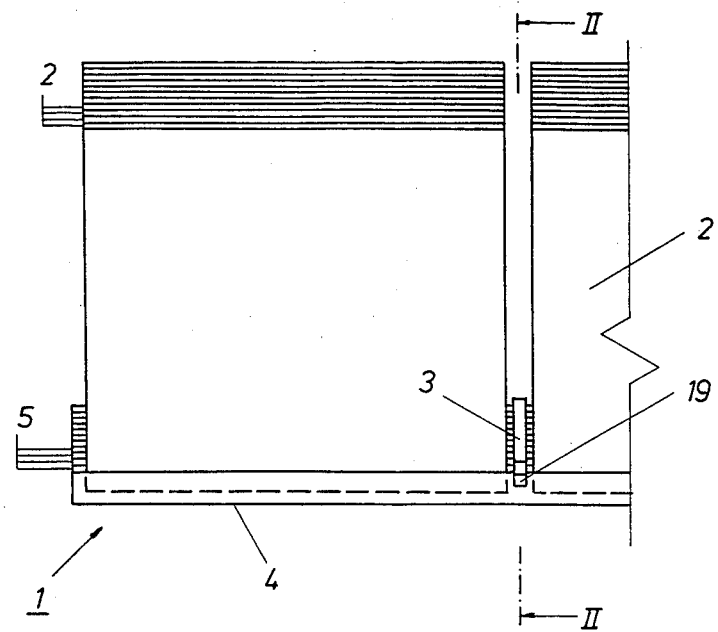
FIG. 1 is a diagram of a front view of a device for receiving and displaying CD cassettes.

In the particularly preferred embodiment shown in FIGS. 1 to 3 and identified by 1, a plurality of rows of CD (compact disk) cassettes are disposed as rigid flat articles in substantially erect skewed positions and displayed. FIG. 1 diagrammatically shows in a partial view two rows of CD cassettes 2, and according to FIG. 2 each row can contain eleven CD cassettes 2 one after another, but naturally in a display case, a stand or box or the like device, for example, a total of ten or twelve rows is conceivable, arranged one beside the other. These rows expediently are separated from each other by rail- or bar-shaped dividers 3 extending between the rows and diagrammatically shown in FIGS. 1 and 2; these dividers 3 will still be described in greater detail.

The device 1 substantially consists of a base 4 of a profile shown in FIG. 2 and which preferably extends over the entire width of all rows together and so, for example, can extend longitudinally, as shown in FIG. 2 in the direction perpendicular to the plane of the drawing, for example, 120 cm. It should be mentioned that the illustration in FIG. 2 shows about the natural size of the cross-section dimensions of the base 4 and of CD cassettes 2 (of which the lower area is shown). The base 4 has a plurality of groove-shaped recesses 5, in this Example 11, which lie one after another; they are called grooves 5, and they perform the function of receiving the lower narrow sides and edge areas of the CD cassettes 2 and function as pivots for said CD cassettes 2 and their support only from their lower edge area, and hold the CD cassettes, both in a rearwardly inclined normal skewed position, which is shown in FIG. 2 by solid lines, as well as in a forwardly pivoted skewed position shown in FIG. 2 by dotted lines, and secure not only against a shift but also against any tilting over. In this connection in each skewed position the support of each CD cassette 2 is at three places, namely, in the base area of the groove 5, on the one hand, as well as in the upper edge areas of the opposite side or support walls 6 defining the grooves, on the other hand, other support areas becoming effective in the rearwardly inclined skewed position and in the forwardly inclined skewed position of the CD cassettes, as will be explained in more detail on the basis of FIG. 3.

As can be seen from FIG. 2 and particularly from FIG. 3, the grooves 5 are separated from each other by walls in the form of bent crosspieces 7, which form the earlier-mentioned support walls 6 which define the grooves 5. Two support areas are provided one above the other on each longitudinal side of the groove 5, namely, a lower downwardly inclined lug area 8, which can also be described as a holding-down area, and a thereover-located, upwardly inclined contact area or support area 9 on which obliquely lies CD cassette 2. The lug area 8 on one longitudinal side of a groove 5 lies parallel to the contact area 9 on the opposite longitudinal side of said groove, said areas 8, 9 or the thereby-provided imaginary extension areas each enclosing an angle of 30° with a median or symmetry plane 10 of grooves 5 shown in a vertical position in FIG. 3. Therefore, this median plane 10 can also be called the symmetry plane, since in the present example of an embodiment, as seen in FIG. 3, each of the grooves 5 is symmetrically shaped relative to the said plane 10 beginning from the bottom of the groove to the contact area 9; only each right contact 9 is extended in comparison to the left contact area. These extensions are produced, since in the assembly of an embodiment according to FIGS. 2 and 3, the grooves 5 are stepwise ascendingly disposed one after another, so that the undercuts or the undercut edges of grooves 5, which are defined by the downwardly-inclined lug areas 8, are mutually offset in height in adjoining grooves 5. This provides an angular appearance to the crosspieces 7 which separate the grooves 5 from each other. The grooves 5 ascend according to imaginary plane 11, which in the present case forms, for example, the underside of the base part 4 and slantingly extends 8° to the horizontal plane 12, which plane stands perpendicularly to the above-named median planes 10. The result in this area is that the CD cassettes 2, both in the rear normal skewed position and in the forwardly tilted skewed position, form an angle of 30° to the vertical. Insofar as the base 4 with plane 11 had to be disposed in horizontal arrangement (so that according to FIG. 3, the median plane 10 would be inclined to the right by an angle of 8° to the vertical), the CD cassettes 2 would in one skewed position, for example, the rear skewed position (if the right side according to FIGS. 2 and 3 is looked upon as the rear side of the device 1), then enclose an angle of 30° to the vertical, i.e., they would be disposed with a greater slope, while in the other (e.g., front) skewed position, they would enclose an angle of only 22° to the vertical, i.e., they would be steeper. Such arrangement can be provided, for example, if device 1 is disposed in a case or a box in a relatively deep position where observation would be possible from a higher point; but a reverse arrangement (where in the last-mentioned example the left side in FIG. 3 would be the rear side of the device) would be selected if the device is at a greater height, particularly at eye level; and then it would be advantageous if the CD cassettes 2 forwardly tilted "out of the way" would be disposed more fat to make possible a better view of the CD cassettes located in the back, and more steeply disposed in the rearwardly inclined skewed position. These characteristics of the described device 1 can be advantageously utilized in the below in greater detail described arrangements in the display case according to FIG. 10.

According to FIG. 3, the grooves 5 have a substantially arcuate bottom in cross section, two sectors 13, 14 of arcuate cross section have an axis 15 in common and are separated from one another by a triangular in cross section projection 16. This projection 16 medially provided in the groove 5 is a rounded-off projection to support each CD cassette 2, during the pivoting movement from the one skewed position to the other, namely on its narrow side, and to guide; at the same time it provides a lug for the lower edge 17 or 18 of the CD cassette 2 in each skewed position, thus to take care of an additional setting of the CD cassette 2 in its skewed position. But this rounded-off projection 16, as shown in FIG. 3 in a dotted line, can also be dispensed with, and then each groove is formed with a single sector or base of arcuate cross section (i.e., a cylindrical area section). It is also important for a quiet, frictionless course of movement on swinging the CD cassette 2, that the said axis in common 15 at the same time (at least about the same time), represents the pivot axis for the CD cassette 2 characterized in that the in-cross-section-arcuate groove bottom forms a guide or slide area for both lower edges 17, 18 of the CD cassettes 2.

The radius R of the in-cross-section-arcuate sectors or of the base 13, 14 of each groove 5 is about 7.2 mm, and the distance d between the in-parallel-extending planes through the lug area 8 on the one side wall 6 of the groove 5 and the contact area 9 on the opposite side wall 6 of the groove amounts, according to the thickness of the CD cassettes 2, to about 10 to 10.5 mm, particulary 10.4 mm. For the effective distance D between both support areas of each pair, i.e., the width of the opening of each groove 5, thus results in the case of an angle of 30° for the CD cassettes in each skewed position a dimension of about 12 mm.

Finally, it should still be mentioned regarding the embodiment according to FIGS. 1 to 3 that—as can also be seen in FIG. 3—in each groove 5 the axis in common 15 which is mentioned is also the pivot axis for the CD cassettes 2 likewise in the plane between the lug areas 8 and contact areas 9, said plane extending parallel to plane 12.

As already mentioned, the rows of CD cassettes 2 are separated from one another by the dividers 3 disposed therebetween. Such divider 3 is also diagrammatically shown in FIG. 2 by dash-dotted lines, and it is seen that these dividers 3 are in the form of a bar or rail. The divider 3 has in-pairs-disposed downwardly projecting flexibly deflectable snap projections 19 by which it is flexibly clamped on the crosspieces 7. It is possible in this connection so to provide the divider 3 with snap projections 19 that it can be fixed on all crosspieces 7, but as seen in FIG. 2, there can also be provided fewer pairs of snap projections 19 to dispose the divider 3 only on some of the crosspieces or walls 7 between the grooves 5. The bar-shaped divider 3 in FIG. 4 is diagrammatically shown in cross section, and the (for example, glued or welded) springy snap projections 19 have been recognized in the shape of lobes or fingers. Preferably the dividers 3 are made of plastic.

But the base 4 expediently is an aluminum extruded profile in the intended length, for example, as mentioned, 120 cm. This elongated extruded profile can be mounted in a conventional way on both its front sides on the side walls of a case; a man of the art can readily do this, and this is not shown in detail in the drawing.

FIG. 5 shows in cross section corresponding to the representation in FIG. 3 a similar embodiment basically according to FIGS. 1 to 3. The embodiment according to FIG. 5 insofar differs from the one according to FIG. 3 as now the grooves 5 are all disposed at the same height; in other words, the grooves 5 are disposed according to an imaginary plane 11 (=the underside of the base 4), which extends perpendicularly to the median or symmetry planes 10 of the grooves 5. Accordingly, the undercuts of the grooves 5 defined by the contact areas downwardly inclined are not mutually offset in height, as in FIG. 3, and this leads to that the spacing of grooves 5, i.e., the distance between the grooves, is somewhat greater than the embodiment according to FIG. 3, since a certain minimum strength of material for the crosspieces or walls 7 is required between the grooves 5 for reasons of strength, and this minimum strength is decisive at the height of the undercut, that is, there where the lug areas 8 adjoin the bottom sector 20 of the groove, which, for example, is likewise arcuate in cross section. Besides, the lug areas 8 are, for example, again plane and they can be inclined particularly at 30° to the vertical. Likewise, plane areas, similarly as in FIG. 3, can be provided as contact areas 9, as shown in FIG. 5 in solid lines, but it is also possible so to form these contact areas or support areas 9 that the crosspieces 7 are rounded on their upper sides, as shown in FIG. 5 in dotted lines, and narrower contact areas 9 obtain in a certain case line-shaped contact areas. Thus, the crosspieces 7, as seen in cross section, are of conical appearance with tapering cylindrical surface sectors in the lower area and a thereto-adjoining roll-shaped thickened pad. It should also be mentioned that, contrary to FIG. 3, now also the crosspieces 7 can be or are symmetrically formed relative to a vertical plane. Besides, for the embodiment according to FIG. 5, the effective distance D between the support areas, according to the intended angle of the CD cassettes 2 in each skewed position, can be selected slightly greater than the thickness d of the cassettes. Furthermore, also in respect of FIG. 5, the axis 15 of the cylindrical surface sector 20 (i.e. of the groove bottom) defines at the same time the axis for the pivotal movement of the CD cassettes 2, and both lower edges 17, 18 of the CD cassettes 2 in the pivotal movement are slidingly guided through the said cylindrical surface sector 20. Naturally, if so desired, also in the embodiment of FIG. 5 there is provided in each groove 5 a median rounded-off projection of triangular shape, in cross section similarly to the projection 16 of FIG. 3, as diagrammatically shown in a dotted line in, FIG. 5 in the median groove 5. Also the bottom 4 of the device 1, as shown in FIG. 3, can be provided on the underside with recessed groove-shaped areas 21, to save material, and a similar configuration of the underside is shown in FIG. 5 in dotted lines. Expediently, also the bottom 4 according to FIG. 5 is an extruded aluminum profile.

The so-far-described embodiments of the device of the invention are primarily conceived for receiving CD cassettes, which are relatively thin (about 10 mm) and which are of relatively slight mass. The described devices can be used for display arrangements in businesses as well as for home furniture. In the latter case it is particularly possible to connect the bottom 4, preferably an extruded aluminum profile forming said bottom, to a drawer in a cupboard or a sideboard in order to hold the CD cassettes in private use in assorted and well-surveyed condition. Particularly suitable for such use is the embodiment of FIGS. 1 to 3 with the application of the already-described arrangement where the imaginary plane 11 which follows the arrangement of the grooves 5 is horizontally disposed, so that the CD cassettes 2 in the position of rest are more flat and thus require a smaller height while in the drawn-out condition the device in browsing can be without difficulty disposed steeper, i.e., pivoted into the front skewed position.

But the embodiments now to be described, according to FIGS. 6, 7 as well as 8 and 9, are particularly suitable for disposing the video cassettes 22 or the so-called video-book-boxes (book-like video cassettes with front walls and rear walls projecting flange-like on the upper side) on the one longitudinal side and on the underside over the actual cassette—or box body, as well as a spine connecting both walls to one another; said spine both at the top and at the bottom extends beyond the body of the cassette). The above-in-detail-described, on the basis of FIGS. 1 to 3, principle of the pivotable support of the cassettes or boxes only in the lower edge area in groove-shaped recesses which have corresponding support areas is applicable in a corresponding way also to these embodiments, so that it is unnecessary to repeat said description. In determining the dimensions of the grooves 5 or walls 6, 7, also the greater thickness of the video cassettes should be taken into account, and in the case of an embodiment equivalent to FIG. 3 (compare FIG. 6) the result is particularly a greater dimension of the undercut, whereby, if a similarly tight arrangement of the video cassette 22 is intended, there is a greater in height offset of the grooves 5, i.e., grooves 5 rise according to a steeper imaginary plane 11. Besides, it is seen from FIG. 6 that also here support areas arranged in pairs are provided in the form of contact areas or surfaces 9 and obliquely downwardly extended lug areas of the holddown areas 8. The bottom of the groove is again expediently of the shape of a cylindrical section 20 or in the form of two partial sectors 13, 14, separated from one another by a rounded-off projection 16 triangular in cross section as shown in FIG. 6 by dotted lines.

The embodiment according to FIG. 6 is in a similar way suitable for compact, i.e.. parallelepiped, video cassettes 22, such as for the already-mentioned booklike cassettes; compare also the dash-dotted line 22 A, which diagrammatically shows the configuration of the cassettes with downwardly-overhanging flange-shaped projections of the front wall or the rear wall.

The pivoting holding means can be modified according to FIG. 6, see also FIG. 7, in order to obtain an additionally-improved guidance for such video-book-boxes during the pivoting movement; in this connection, a median hump-shaped fillet 23 divides the groove-shaped recess 5 into two partial grooves 27, which extend in parallel, and whose side walls 24 are in addition undercut in order to hold or clamp the cassette 22 in each skewed position only over one of the flange-shaped overhanging wall projections, e.g., of each rear wall 25 of the cassette 22. Accordingly, all support areas for the cassette 22 are formed by the side wall 24 of the fillet 23 and the thereto-offset side wall 26 of the groove-shaped recess 5. Thus these support areas of the cassette 22 correspond again in principle to the above-described contact areas 9 and lug areas 8, and they are identified by these reference numerals in FIG. 7. The cassettes 22 in each skewed position, in which, as mentioned, they are fixed with only a wall projection in a partial groove 26, have their lower edge area of the other wall lying on the opposite side wall of the groove-shaped recess 5; but this is not absolutely necessary, and they can in the end skewed position in the median area have their lower narrow side lie in the upper side of the hump-shaped fillet; but this is not absolutely necessary.

It turned out in the embodiments according to FIGS. 6 and 7 that it is more expedient to form the base not as in the embodiments according to FIGS. 1 to 5 from extruded aluminum profiles, but instead from profiled sheet steel, to achieve in such a way—considering the heavy video cassettes —greater strength. Another beneficial possibility of production is to shape in vacuo of plastic, as will be explained in greater detail on the basis of FIGS. 12 and 13. In producing profiled sheet steel, it is expedient to provide narrower units, about for 3 to 4 video cassettes 22 one after another, to obtain a kind of skewed shelf according to the steeper arrangement of the groove-shaped recesses 5 over a greater height; a plurality of such sheet iron sectors can be joined to one another in their longitudinal edge areas, in order to arrange, for example, twenty or thirty video cassettes in a row one after another. This connection, as seen in FIGS. 6 and 7 at 28, can be obtained in that each upper longitudinal edge 29 of a lower sheet iron sector is bent hooklike in cross section, so that said lower sheet iron sector or base part 4 can be suspended over the lower longitudinal edge of the next upper sector or bottom part. In order to obtain a corresponding contact area 9 for the video cassette 22 also in this connecting area 28, the lower longitudinal edge of each sheet iron sector or base can be correspondingly bent under an angle or offset, as seen in FIGS. 6 and 7.

FIGS. 8 and 9 show an embodiment, which likewise is conceived for accommodating book-shaped video cassettes, and which simply consists of a base plate 30, on which are mounted spaced and oppositely-directed angular profiles 31 in pairs with their individual horizontal arms 32, while the other vertical arms 33 form the side walls of groove-shaped recesses 5 to receive the cassettes 22 again with their lower edge areas. The hump-shaped fillet 23 is formed here by a U-profile rail 34, which is likewise mounted on the base plate 30. (Instead can be used a closed rectangular profile.) Said profiles 31 or 34 can be mounted, for example, by screwing or riveting or by gluing. In order to securely hold the video cassettes 22 in spite of the support areas (vertical arms 23 of the angular profiles 31 or vertical arms 35 of the U-profile rails 34) simply vertically extending, it is expedient to apply a friction-increasing coating or foam plastic coating on said vertical arms and side walls, as shown by dotted lines at 36 in FIG. 8.

The basic operation of the embodiment of FIG. 8 corresponds, as will be immediately seen, to the embodiment of FIG. 7. It should be mentioned that the video cassettes 22 do not purely pivot on browsing, but also slightly move up and down, if they are kipped from one lower edge (e.g., the rear one) to the other (e.g., the front one).

In order to receive in the said booklike video cassettes also the downwardly overhanging spine in spite of the hump-shaped fillets 23 (formed according to FIG. 8 by U-profile rail 34), these hump-shaped fillets are then interrupted, i.e., these fillets extend only over one part of the width of the device or over one part of the length of the groove-shaped recess 5. In the case of the arrangement of a plurality of rows of video cassettes one next to the other similarly as in the arrangement according to FIG. 1, the result is that the hump-shaped fillets 23 having spaced interruptions corresponding to the widths of the video cassettes (considering a slight interspace) must be interrupted, e.g. undercut. Such undercutting would be considerable in the embodiment according to FIG. 7. The embodiment of FIGS. 8 and 9 with the profile rails provides here the possibility to introduce simply shorter spaced U-profile rails 34 to produce interspaces 37 to receive the book spine of the video cassettes 22; compare the arrangement only diagrammatically shown in dotted line of such booklike video cassette 22 in FIG. 9.

In an already earlier proposed display device for CD cassettes in the form of a presentation box, there is provided an in side view substantially concave-mirror arrangement of upper rows of receiving drawers and lower, stepwise arranged in rows, horizontal box-shaped receiving compartments, as well as a median row of receiving compartments attached to the rear wall of the case. In such a display case, for example, 100 or 120 cm wide and beginning at approximate hip height with the lowermost row of receiving compartments, there can be arranged a relatively great number of CD cassettes adapted for ready survey as well as for satisfactory accessibility on browsing or withdrawal of CD cassettes. The particularly preferred embodiment of the invention according to FIGS. 1 to 3 with the automatically ascending or descending arrangement of CD cassettes in a row now results, as diagrammatically shown in FIG. 10, in a particularly advantageous possibility of still more increasing the number of CD cassettes to be inserted in such display case 38. In this connection—likewise at approximate hip height—there are disposed a plurality, for example three, of rows of receiving compartments 39 formed by the devices 1, according to FIGS. 1 to 3, with rearwardly-descending bases 4; said bases 4 can also be steeper than in FIG. 2 (where the base falls from the right to the left). Particularly advantageous here is, as shown in the same design of devices 1 as shown in FIG. 3, i.e. with an angle of 8° between the planes 11 and 12, so to arrange the bases 4 that the plane 11, according to which the grooves 5 (FIG. 2) descend, is more inclined to an angle of 15°, so that the received CD cassettes 2 are disposed more flat in their normal rear skewed position than in their forwardly-inclined skewed position, which makes possible a better view from the top in spite of the relatively deep arrangement. In this connection, the device 1 can be arranged—otherwise than in the known presentation device—according to FIG. 10 each with their front edge beginning at the same height, and the height distance between the rear edge of a base 4 and the front edge of the base 4 of the next following device corresponds substantially approximately to the height required by a CD cassette 2 in the rear (flat) skewed position.

A row 40 of receiving compartments in the form of another device 1 with a rearwardly descending base can be provided over the rearmost device 1 of said arrangement, corresponding to the median row of receiving compartments in the known display case. Over said device or row 40 of receiving compartments than can be formed in the arrangement of the display case according to FIG. 10, due to the described skewed position of the lower devices 1 and the thereby-recovered space, still an additional row 41 of receiving compartments can be formed by a device 1 according to the invention, and said device can be disposed with the rearwardly ascending base. Also, rows 42 of receiving compartments are present in a conventional way for each CD cassette 2 in a receiving drawer.

Another display case 43 is shown in FIG. 11, which is conceived for readily surveyable presentation of video cassettes 22, likewise in a side-view substantially concave mirror arrangement. Similarly as in the arrangement of FIG. 10, again then in the upper case arrangement, rows 44 of receiving compartments can be provided in a conventional way stepwise upwardly projecting. The video cassettes are disposed in the lower case area in an inclined shelf 45, which in a way previously described in connection with FIGS. 6 and 7, is formed by overhanging and connected to one another profiled sheet iron sectors. In view of the above explanations in connection with FIGS. 6 and 7, there is no need for discussing any further the formation of a skewed shelf 45.

FIGS. 10 and 11 only diagrammatically show devices 1 with base 4, and a detailed illustration of the profiles of the bases can be dispensed with in view of the preceding drawings.

Devices 1 or base parts 4 according to FIGS. 6 or 7 instead of profiled sheet iron can also be made by extrusion or in vacuo shaping of a thermoplastic sheet, as will now be explained on the basis of FIGS. 12 and 13.

FIG. 12 diagrammatically shows a convention arrangement for extrusion of plastic articles by vacuum molding where only one die 46 is provided over which is applied a sheet or plate 47 to be molded of thermoplastic material. This sheet 47 can be held, for example, by tight diagrammatically shown spindles 48, and after heating by means of heating lamps 49, moved against the mold 46. The sheet 47 in approximate adjustment to the mold 46 is spanned thereover without adjustment to the precise contours of the mold surface 50. Possibly, as shown by a dotted line at 51 by means of a die or the like the sheet 47 is pressed into the recesses of the mold surface 50. The final molding takes place by applying a vacuum or underpressure between the mold surface 50 and the spanned-thereover sheet 47 over suction channels 52 opening into the mold surface 50, one of which channels is shown by way of example in FIG. 12. Sheet 47 tightly adheres to the mold 46 or the mold surface 50 and adopts it configuration; it is then cooled and left to set. Then the molded article is taken off the mold 46 and a next article can then be produced by the same mold.

This known vacuum process is eminently adapted for mass production of thin-walled articles, such as containers, plates, cups and the like. But there are difficulties if the articles to be produced are meant to have undercut areas, such as the base 4 of FIG. 6. Then the die 46 must be correspondingly undercut, as diagrammatically shown at 53 in FIG. 12. In order to remove the article from the mold 46, the mold 46 can be divided in order to move the single parts of the mold separately by means of shifting means or the like, in order to separate the mold and the molded article. But this technique often is expensive and cumbersome.

Instead, as shown in FIG. 13, to the mold 46 are applied support parts 54, which are formed and detachably attached to the corresponding configuration of the intended undercut areas, obviously reduced by the thickness of the material of the plastic sheet 47. More particularly, bent support fillets of sheet steel are introduced in the illustrated embodiment as support parts 54 having their lower shift area 55 inserted in recesses 56 provided in the mold 46 and extending from the mold surface 50 in the shape of straight grooves into the mold 46. The mold 46 also has the already-mentioned suction channels 52, some of which open quite close to the recesses 56 on the mold surface 50. If now a vacuum is applied through the suction channels 52, the sheet 47 not only snugly adheres to the mold surface 50 but also to the surface of the support fillets 54, so that the shape shown in FIG. 3 is maintained, in which the sheet 47 is left to set. Thereupon, the so-obtained base part together with the support fillets 54 now mostly enclosed in the plastic material is withdrawn from the mold 46, and the support fillets 54 project only with their lower shaft area 55 from the plastic base part, namely on the underside thereof. This shaft area 55 could, if so intended, be cut, ground or separated in some other way. But these base parts according to FIG. 6 (or 7) as a rule do not disturb these projecting shaft areas 55 and can as well be left alone.

In such way, the undercut areas 53 can be obtained by vacuum molding of the base parts, and a simple mold 46 can be used.

Another advantage of the described method is that the support fillets 54, which remain in the vacuum-molded base part, at the same time provide a stiffening or reinforcing for the produced base part, so that its strength and rigidity are substantially increased. This is of particular significance in respect of the mentioned base parts according to FIGS. 6 or 7, since it makes possible to produce cup-shaped base parts, for example, 1 m long and ½ m wide, and to fill these cup-shaped base parts with cassettes 22, such as video cassettes, adequate strength being given in supporting the base part only on its edges to support the weight of cassette 22. It is also advantageous in this connection if the support fillets 54 are bent. In order to reinforce the bond between the support fillets 54 and the molded plastic sheet 47, the support fillets 54 can be provided with an adhesive or bonding agent prior to the suction of the plastic sheet 47 thereagainst. It is particularly expedient to apply an adequately heat-resistant adhesive on the support fillets 54. Insofar as the support fillets 54 are likewise made of plastic material, an opportunity is provided to bond after vacuum molding the molded plastic sheet to the support fillets 54 at least in some areas by ultra-welding or local heating.

Although preferred embodiments have explained the invention in detail, naturally other modifications and changes are possible without going beyond the scope of the invention. For example, it is basically conceivable in the described devices to make the base 40 as a plastic shaped part by blasting. In smaller units, particularly for home application, also sectors of an extruded plastic profile naturally can be used for the base parts 4. Furthermore, in conjunction with FIGS. 8 and 9 has been mentioned a friction-increasing coating or foam plastic coating, so that naturally such coating in the form of a glued-on covering can well be provided in other embodiments. More particularly, such coating, even if an increase in friction for the secure fixing of the articles in their skewed positions would not be necessary, provides the advantage of a particularly gentle treatment of the articles, particularly in browsing, since the articles then slide or glide with their undersides on a soft yielding underlayer. In addition to a glued-on material coating, Other coating methods are conceivable, such as spraying of a plastic coating and the like.

Furthermore, in order to separate from one another the rows of articles arranged one after another, particularly in cassettes, not only the bar- or rail-shaped dividers can be provided according to FIGS. 1, 2, and 4, but instead of plate-shaped parts or dividing parts can be disposed between the rows, and in addition, for example, hump-shaped or burl-shaped projections can be provided in the groove-shaped recesses 5 for the purpose of subdividing, as shown in FIG. 5, by a dash-dotted line. These projections 57 function as lateral lugs for the articles 2 (FIGS. 1 to 5) or 22 (FIGS. 6, 7) and thereby prevent an undesirable lateral shift thereof. In this function, the lug projections 57 are also comparable to the fillets 23 according to FIG. 9 provided with interruptions and shaped as U-profile rails 34, where said rails with their front sides prevent lateral shift of the cassettes 22, since they form a lug area for the downwardly projecting spine of the cassettes 22, which is received in the mentioned interspace 37.

In the case of an oblique shelf for video cassettes, as shown in FIGS. 6, 7 or 11, a bar- or rail-shaped divider similar to divider 3 of FIGS. 1 and 2, can likewise be advantageously provided, but it is expedient here, instead of the divider 3, to provide a firm connection with the walls or crosspieces 7 (or at least some of them) by welding, soldering or gluing.

Regarding the configuration of the grooves or groove-shaped recesses 5, a modification of the embodiments of FIGS. 1 to 7 is also possible in providing a plane groove base and/or straight (vertical) groove side walls (as shown in FIG. 8, but without a fillet 23), and above all in such straight walls a friction-increasing surface (coating or surface treatment) is expedient. On the other hand, the groove base can also be so shaped, see the dash-dotted embodiment of FIG. 6, that a median support and rounded-off projection similar to the projection 16 is present, but on both sides thereof the groove base is sunk so that the cassettes do not lie there with their underside (but only on the median support and rounded-off projection by which they are guided).

Regarding the method explained as accompanied by FIG. 13, it should be finally mentioned that it is also possible to introduce a grid-shaped structure as support fillets, insofar as the structures are endowed with only adequate rigidity, so that the plastic sheet 46 can lie on the same in vacuum molding. The spacings between the suction channels 54 of the mold 46 should naturally be selected according to the circumstances, to the plasticity and thickness of the plastic sheet, as known per se; essential is only that some of the suction channels open on the surface of the mold next to the support fillets so that likewise an underpressure is produced in the area of said support fillets to suck the plastic sheet to the support fillets. The described method can also be used in the production of base parts from different thermoplastic compositions, as, for example, polypropylene, polymethyl acrylate, ABS (acryl butadiene styrene), hard PVC (poly vinyl chloride), polyethylene or polycarbonate.

I claim:

1. A device for receiving rigid flat articles, such as CD, audio or video cassettes or the like, comprising a generally planar base supporting the articles substantially erect for display and arranged one after the other in either of two oppositely inclined, stable positions, said base having a plurality of upstanding support walls forming a series of identical parallel transverse recesses for preventing the articles from unintentional shifting, said recesses each having in cross-section a bottom wall profile and a cooperating pair of opposed side walls formed to facilitate pivoting the articles between said two stable positions without removing said articles from said base, said opposed side walls providing first and second pairs of cooperating support areas, said first pair of support areas cooperating with said bottom wall profile so that the articles are held in the first stable position inclined in one direction relative to said planar base, and said second pair of support areas cooperating with said bottom wall profile so that the articles are held in the second stable position inclined in an opposite direction relative to said planar base.

2. The device according to claim 1, wherein at least one of each pair of support walls is undercut along the edge.

3. The device according to claim 1, wherein the bottom wall profile has at least one sector arcuate in cross section to guide one edge of each article on its being pivoted.

4. The device according to claim 3, wherein the bottom wall profile has two sectors arcuate in cross section separated from one another by a median having in cross section a shape approximating a triangular rounded off projection.

5. The device according to claim 4, wherein both sectors arcuate in cross section form parts of an imaginary cylindrical area with a common axis.

6. The device according to claim 1, wherein the pairs cooperating support areas for the articles comprise parallel extending contact areas and lug areas, the contact areas extending obliquely upwardly and the lug areas obliquely downwardly, and for each pair of cooperating support areas the contact area and the lug area are parallel on opposite support walls.

7. The device according to claim 6, wherein the contact areas and lug areas enclose an angle of about 30° to the median or symmetry plane of each recess.

8. The device according to claim 2, wherein the recesses are provided in a stepwise ascending or descending arrangement, the consecutive undercuts of adjacent recesses being mutually offset in height.

9. The device according to claim 2, wherein the recesses are disposed according to an imaginary plane which extends inclined at about 8° to a plane perpendicular to the median or symmetry plane of each recess.

10. The device according to claim 2, wherein the recesses are disposed according to an imaginary plane which extends perpendicularly to the median or symmetry plane of each recess.

11. The device according to claim 10, wherein the recesses are separated from one another by the support walls which form conical crosspieces in cross section tapering in their lower area and burlshaped in their upper area.

12. The device according to claim 1, for book-like video cassettes with flange-like overhanging front and rear walls, wherein each of the recesses is divided by a medially disposed hump-shaped fillet having side walls producing two parallel extending partial grooves, each groove receiving one of the overhanging cassette walls.

13. The device according to claim 12, wherein each side wall of fillet and the opposite side wall of the recess define the support areas for the video cassettes in one of the two inclined positions.

14. The device according to claim 13, wherein at least the side walls of the fillet are constructed with undercuts.

15. The device according to claim 12, wherein the upper side of the hump-shaped fillet has a cylindrical surface arched to form a guide-slide area for the underside of each video cassette between the overhanging front and rear walls.

16. The device according to claim 12, wherein the side walls of the recesses extend vertically.

17. The device according to claim 16, wherein the side walls of the recesses are formed by first arms having an angular profile, which are mounted with second arms on the base.

18. The device according to claim 12, wherein at least the side walls of the fillet have a friction-increasing coating.

19. The device according to claim 12, wherein the hump-shaped fillets are formed by U-profiles mounted on a base plate.

20. The device according to claim 12, for book-like video cassettes with a likewise overhanging spine connecting the front and the rear walls, wherein the hump-shaped fillets extend only over a part of the length of the recesses.

21. The device according to claim 20, for the arrangement of a plurality of video cassettes one next to the other in a through recess, wherein the hump-shaped fillets are interrupted in distances corresponding approximately to the width of the video cassettes to receive the downwardly extending portions of the spine of the video cassettes.

22. The device according to claim 1, wherein the base is formed by an extruded profile.

23. The device according to claim 1, wherein the base is formed from a metallic profile.

24. The device according to claim 1, wherein the length of the recesses for a plurality of articles is measured one next to the other to form rows and at least one divider bar is mounted for separating the said rows of consecutively disposed articles on at least some of the walls limiting the recesses.

25. The device according to claim 24, wherein the divider is provided with protruding pairs of flexible deflectable snap projections for being clamped on the walls.

26. The device according to claim 24, wherein the divider is firmly attached by welding, soldering, gluing or the like.

27. The device according to claim 1, wherein to separate adjacent articles in the recesses there are provided within the groove-shaped recesses nub-shaped lug projections for the articles.

28. An arrangement of a plurality of the devices according to any preceding claim in a display case, wherein the devices are arranged one after another in the lower area of the display case, said display case shaped substantially as a concave-mirror, each device including an inclined base with rearwardly descending recesses, and the base of each device beginning at the same height, the articles in the first inclined position enclosing a smaller angle to the vertical than in the second inclined position, and the difference in height between the rear end of the base of a device and the front end of the base of the next following device is about equal to the height of an article in the first inclined position.

29. The arrangement according to claim 28, wherein over the rearmost device are provided two further devices, of which the lower is likewise disposed with the rearwardly descending base and the upper one with the rearwardly ascending base.

* * * * *